(12) United States Patent
Ahn et al.

(10) Patent No.: US 10,782,411 B2
(45) Date of Patent: Sep. 22, 2020

(54) VEHICLE POSE SYSTEM

(71) Applicant: UATC, LLC, San Francisco, CA (US)

(72) Inventors: Rachel Ahn, Pittsburgh, PA (US);
David Prasser, Pittsburgh, PA (US);
Peter Hansen, Pittsburgh, PA (US);
Robert Zlot, Pittsburgh, PA (US);
Ethan Duff Eade, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 103 days.

(21) Appl. No.: 15/987,517

(22) Filed: May 23, 2018

(65) Prior Publication Data

US 2019/0219699 A1    Jul. 18, 2019

Related U.S. Application Data

(60) Provisional application No. 62/617,006, filed on Jan. 12, 2018.

(51) Int. Cl.
| | |
|---|---|
| *G01S 17/89* | (2020.01) |
| *G01C 21/00* | (2006.01) |
| *G01S 5/16* | (2006.01) |
| *G01S 19/49* | (2010.01) |
| *G01S 5/02* | (2010.01) |
| *G01S 19/53* | (2010.01) |

(52) U.S. Cl.
CPC .......... *G01S 17/89* (2013.01); *G01C 21/005* (2013.01); *G01S 5/0247* (2013.01); *G01S 5/0263* (2013.01); *G01S 5/163* (2013.01); *G01S 19/49* (2013.01); *G01S 19/53* (2013.01)

(58) Field of Classification Search
CPC ........ G01S 17/89; G01S 19/49; G01S 5/0247; G01S 19/53; G01S 5/0263; G01S 5/163; G01S 17/931; G01S 7/4808; G01C 21/005; G01C 21/30
See application file for complete search history.

(56) References Cited

U.S. PATENT DOCUMENTS

| | | | | |
|---|---|---|---|---|
| 10,395,117 | B1 * | 8/2019 | Zhang | G06K 9/4604 |
| 10,496,104 | B1 * | 12/2019 | Liu | G01S 19/14 |
| 10,580,386 | B2 * | 3/2020 | Gusikhin | G09G 3/2003 |
| 10,589,738 | B1 * | 3/2020 | Boecker | B60W 30/02 |
| 2017/0124781 | A1 * | 5/2017 | Douillard | G08G 1/202 |

(Continued)

OTHER PUBLICATIONS

Levinson, Jesse, et al., "Map-Based Precision Vehicle Localization in Urban Environments", Robotics: Science and Systems. vol. 4, (2007), 8 pgs.

(Continued)

*Primary Examiner* — Mary Cheung
(74) *Attorney, Agent, or Firm* — Schwegman Lundberg & Woessner, P.A.

(57) ABSTRACT

Various examples are directed to systems and methods for determining a pose of a vehicle. A first localizer may generate a first pose estimate for the vehicle based at least in part on a comparison of first remote sensor data to a first reference data. A second localizer may generate a second pose estimate for the vehicle based at least in part on a comparison of second remote sensor data to a second reference data. A pose state estimator may generate a vehicle pose for the vehicle based at least in part on a first previous pose of the vehicle, the first pose estimate, and the second pose estimate.

20 Claims, 8 Drawing Sheets

(56) References Cited

U.S. PATENT DOCUMENTS

| | | |
|---|---|---|
| 2017/0166216 A1 | 6/2017 | Rander et al. |
| 2017/0343643 A1* | 11/2017 | Churchill ............... G01C 21/30 |
| 2018/0240194 A1* | 8/2018 | Dong ..................... G06Q 40/08 |
| 2018/0276847 A1* | 9/2018 | Last ...................... G06K 9/6271 |
| 2019/0016384 A1* | 1/2019 | Carlson ................. G06Q 10/00 |
| 2019/0147221 A1* | 5/2019 | Grabner ............... G06T 19/006 |
| | | 382/103 |

OTHER PUBLICATIONS

Levinson, Jesse, et al., "Robust vehicle localization in urban environments using probabilistic maps", Robotics and Automation (ICRA), 2010 IEEE International Conference on. IEEE, (2010), 4372-4378.

Wang, Yiyin, et al., "Tracking an asynchronous sensor with Kalman filters", Wireless Communications & Signal Processing (WCSP), 2012 International Conference on. IEEE, (2012), 4 pgs.

\* cited by examiner

VEHICLE POSE SYSTEM

CLAIM FOR PRIORITY

This application claims the benefit of priority of U.S. Provisional Application No. 62/617,006, filed Jan. 12, 2018, which is hereby incorporated by reference in its entirety.

FIELD

The document pertains generally, but not by way of limitation, to devices, systems, and methods for determining a position and/or attitude describing a vehicle.

BACKGROUND

An autonomous vehicle is a vehicle that is capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on to the resulting information.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Figure 1:
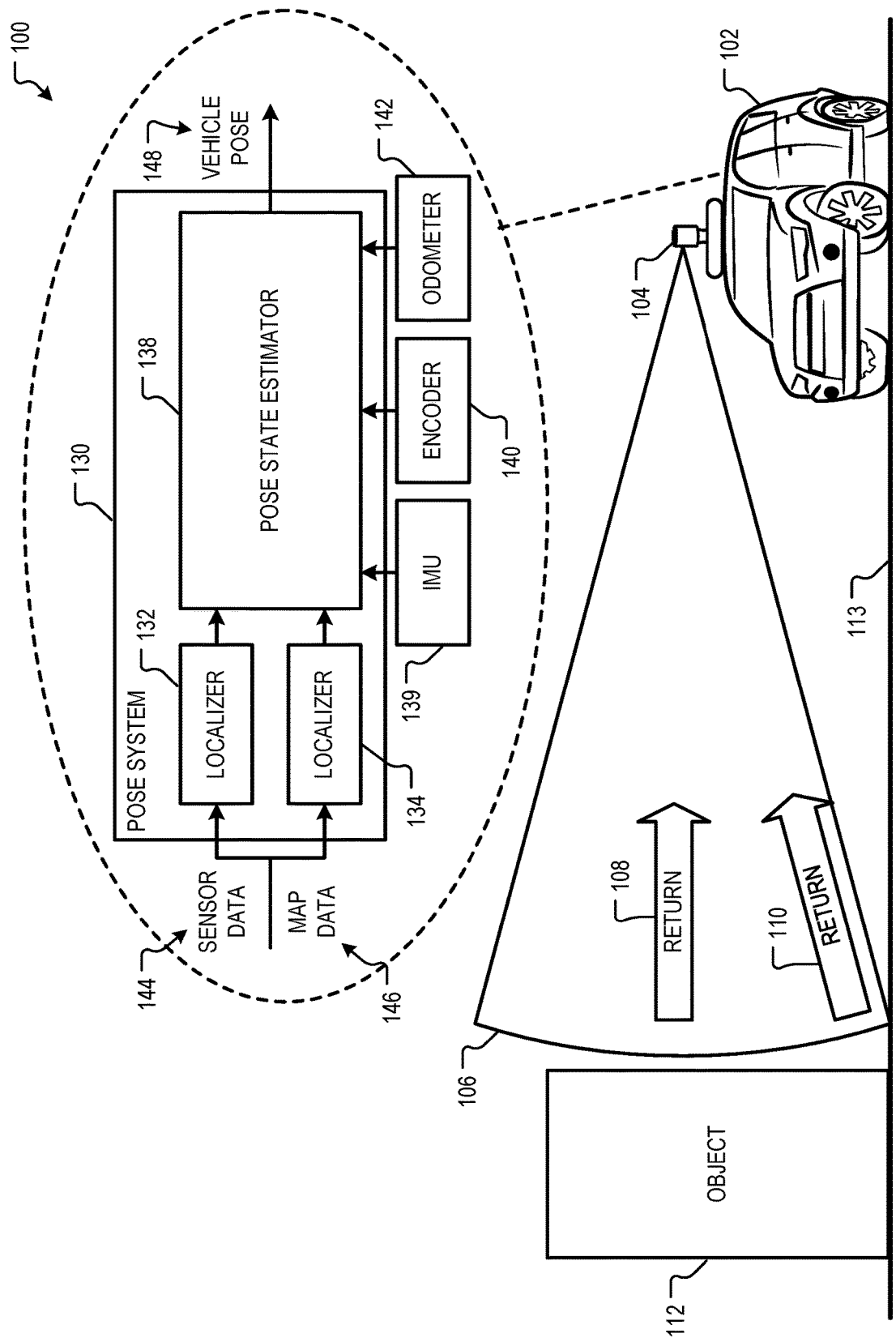
FIG. 1 is a diagram showing one example of an environment including a vehicle having a pose system.

Examples described herein are directed to a pose system for a vehicle. The pose system determines a vehicle pose for the vehicle at different times. A vehicle pose includes a position of the vehicle in a three-dimensional space and an attitude of the vehicle, as described herein. The pose system receives remote sensor data from one or more remote detection sensors such as, for example, a camera, pair of stereoscopic cameras, a LIDAR (light detection and ranging), a RADAR (radio detection and ranging). In some examples, the pose system also receives motion sensor data from one or more motion sensors that sense the motion of the vehicle. Example motion sensors include accelerometers, gyroscopes, encoders, odometers, etc.

The pose system includes one or more localizers and may include a pose state estimator (sometimes also referred to as a pose filter). The localizers and pose state estimator are executed by a processor unit or processor units of a computing device or system, such as a computing device or system located at the vehicle. Localizers generate pose estimates from remote sensor data, for example, by matching the remote sensor data to reference data. Reference data relates remote sensor data to a corresponding vehicle pose. In some examples, reference data is described herein as a map where different combinations of positions on the map and vehicle attitudes are associated with different expected remote sensor data. Reference data, however, may be arranged be in any suitable format that relates remote sensor data to a pose such as, for example, an array, a table, etc. Pose estimates generated by the localizer or estimators are provided to the pose state estimator. The pose state estimator receives pose estimates along with the motion sensor data and generates a vehicle pose for a set of time stamps. In some examples, the pose state estimator periodically generates a vehicle pose (e.g., every ¹⁄₁₀₀ seconds, etc.)

Various examples are directed to a pose system including a pose state estimator that is configured to receive pose estimates from more than one localizer. For example, a first localizer determines a pose estimate from remote sensor data. The first localizer matches remote sensor data to first reference data. A second localizer matches remote sensor data to second reference data that is different than the first reference data. Additional localizers may also be included.

In some examples, the first localizer applies a reference data based on expected spatial positions and orientations of objects around the vehicle (e.g., buildings, trees, geological features, etc.) when the vehicle is in different poses. The remote sensor data indicates detected spatial positions and orientations of objects around the vehicle. The first localizer fits the detected objects indicated by the remote sensor data to the expected spatial positions and orientations of those objects in the first reference data to determine a pose estimate of the vehicle. Also, in some examples, the second localizer applies second reference data that is based on the reflectivity of the ground in the vehicle's environment. The second localizer (or another component) receives and/or derives ground reflectivity data from the remote sensor data and uses the second reference data to relate the ground reflectivity data to a particular pose. For example, the second localizer may match the ground reflectivity to a pose on a map that matches the ground reflectivity data.

In some examples, different localizers utilize different types of remote sensor data. For example, the first localizer may utilize remote sensor data from a LIDAR system while the second localizer utilizes remote sensor data from a RADAR, camera or camera system, etc.

Pose estimates generated by the localizers indicate an estimated spatial position and attitude of the vehicle. The position may be represented according to any suitable coordinate system such as, for example, as a latitude, longitude, and elevation, as an x, y, and z position, etc. The attitude indicates the direction in which the vehicle is pointed and may be expressed, for example, as a pitch, roll, and yaw.

The pose state estimator generates a vehicle pose considering pose estimates from multiple localizers as well as, in some examples motion sensor data. For example, the pose state estimator may implement a Kalman filter or similar algorithm. The pose state estimator generates vehicle poses for the vehicle over different time stamps. If a pose estimate from one or more of the localizers is available at a given time stamp, the pose state estimator generates the vehicle pose for that time stamp based at least in part on the pose estimate or estimates from that time stamp. One or more previous vehicle poses may also be considered, along with motion sensor data from the time stamp. If no pose estimate is available for a time stamp, the pose state estimator generates the vehicle pose based at least in part on a previous vehicle pose and/or motion sensor data.

In some examples, it is desirable for the pose state estimator generate vehicle poses at a higher frequency than the localizers generate pose estimates. Accordingly, the localizers may not generate a pose estimate for each time stamp considered by the pose state estimator. For example, the pose state estimator may generate an initial vehicle pose for a time stamp before a localizer has completed a pose estimate for that time stamp. The initial vehicle pose, for example, is based on one or more prior vehicle poses and motion sensor data. If a localizer is expected to later provide a vehicle pose for the time stamp, the pose state estimator may store its state at the time stamp. When the localizer later provides a pose estimate for the time stamp, the pose state estimator generates a revised vehicle pose for the time stamp. The pose state estimator may also generate revised poses for one or more subsequent time stamps that had been evaluated before the pose estimate was received.

In some examples, localizers also generate covariance indicators describing pose estimates. For example, a covariance indicator describing a pose estimate indicates a level of confidence in the pose estimate. In some examples, the covariance indicator describes more than one dimension including, for example, spatial dimensions, (x position, y position, z position) and attitude dimensions (e.g., pitch, roll, yaw). The covariance indicator may include a matrix or vector, with different scalers of the matrix or vector indicating covariance for different dimensions. For example, a pose estimate may have a high level of confidence in the x dimension, but a lower level of confidence in the yaw value.

The degree to which a pose estimate for a time stamp affects the vehicle pose generated by the pose state estimator for that time stamp (and subsequent time stamps) may depend on the covariance indicator for the pose estimate. For example, consider a first pose estimate from a first localizer and a second pose estimate from a second localizer where the covariance indicator for the first pose estimate indicates a higher confidence level in the first pose estimate than the covariance indicator for the second pose estimate indicates for the second pose estimate. In this case, a vehicle pose generated by the pose state estimator considering both the first pose estimate and the second pose estimate may be closer to the first pose estimate than to the second pose estimate.

Consider another example in which the covariance indicator for a first pose estimate indicates a higher confidence than a second pose estimate in a first dimension and a lower confidence than the second pose estimate in a second dimension. In this example, a vehicle pose generated considering the first and second pose estimates may be closer to the first pose estimate in the first dimension and closer to the second pose estimate in the second direction.

In some examples, different localizers may not provide pose estimates for the same time stamps. For example, a first localizer may provide a first pose estimate for a first time stamp T while a second localizer provides a second pose estimate for a subsequent time stamp T+1. In this case, the vehicle pose generated by the pose state estimator for the time stamp T+1 may be based on both the first pose estimate and the second pose estimate. For example, the pose state estimator may generate a first vehicle pose for the first time stamp T based at least in part on the first pose estimate. The pose state estimator may generate a second vehicle pose for the time stamp T+1 based on the second pose estimate and on the first vehicle pose for the time stamp T. In this way, the second vehicle pose is also based on the first pose estimate.

FIG. 1 is a diagram showing one example of an environment 100 including a vehicle 102 having a pose system 130. The vehicle 102, in some examples, is a self-driving vehicle (SDV) or autonomous vehicle (AV) comprising a vehicle autonomy system (FIG. 2) for operating the vehicle without human intervention. In some examples, the vehicle also, in addition to or instead of a full autonomous mode, includes a semi-autonomous mode in which a human user is responsible for some or all control of the vehicle.

The vehicle 102 comprises one or more remote detection sensors 104 that receive return signals 108, 110 from the environment 100. Return signals 108, 110 may be reflected from objects, such as the object 112 and/or ground, such as ground 113. The remote detection sensors 104 may include one or more active sensors, such as a LIDAR or RADAR, that emit electromagnetic radiation 106 in the form of light or radio waves to generate return signals 108, 110. In some examples, the remote detection sensors 104 include a passive sensor, such as a set of stereoscopic cameras, that receive reflected ambient light or other radiation. The remote detection sensors 104 are shown on top of the vehicle 102. Remote detection sensors 104 may be positioned at any suitable position on the vehicle 102, however, including, for example, on a bumper, behind the windshield, etc.

The pose system 130 receives remote sensor data 144 and reference data 146 and generates vehicle poses 148. Localizers 132, 134 utilize the remote sensor data 144 and the reference data 146 to generate pose estimates that are provided to the pose state estimator 138. The pose state estimator 138 also receives motion sensor data from one or more motion sensors such as, for example, an inertial measurement unit (IMU) 139, one or more encoders, such as encoder 140 and/or an odometer 142. Motion sensor data may be used to supplement pose estimates received from the localizers 132, 134. Although two localizers 132, 134 are shown in FIG. 1, more or fewer localizers may be used.

Figure 2:
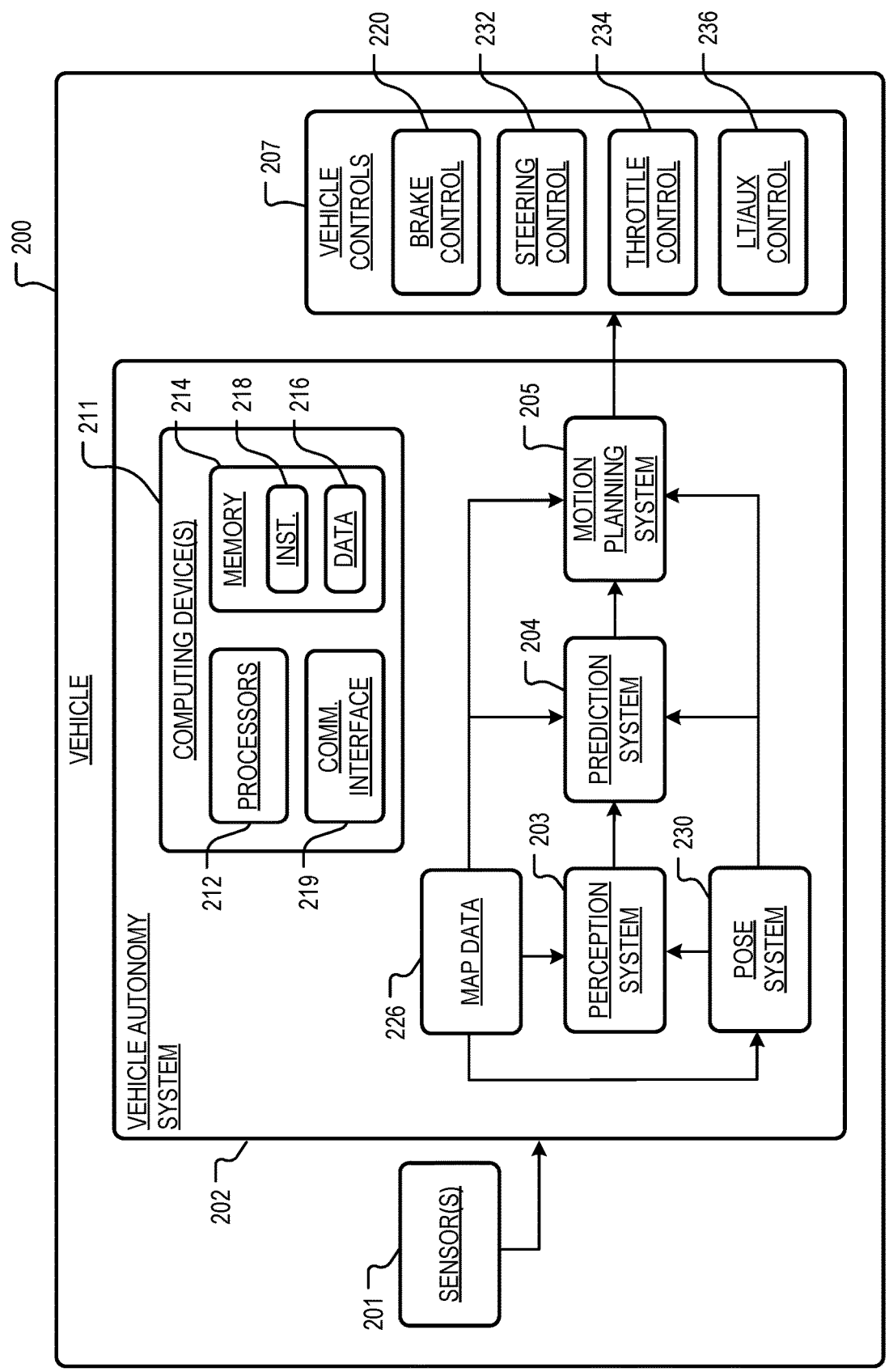
FIG. 2 is a block diagram showing one example of a vehicle according to example aspects of the present disclosure.

FIG. 2 is a block diagram showing one example of a vehicle 200 according to example aspects of the present disclosure. The vehicle 200 can be, for example, an autonomous or semi-autonomous vehicle. The vehicle 200 includes one or more sensors 201, a vehicle autonomy system 202, and one or more vehicle controls 207. The vehicle autonomy system 202 can be engaged to control the vehicle 200 or to assist in controlling the vehicle 200. The vehicle autonomy system 202, sometimes referred to as an Autonomous Vehicle (AV) stack, receives sensor data from the one or more sensors 201, attempts to comprehend the environment surrounding the vehicle 200 by performing various processing techniques on data collected by the sensors 201, and generates an appropriate motion path through the environment. The vehicle autonomy system 202 can control the one or more vehicle controls 207 to operate the vehicle 200 according to the motion path.

The vehicle autonomy system 202 includes a perception system 203, a prediction system 204, a motion planning system 205, and a pose system 230 that cooperate to perceive the surrounding environment of the vehicle 200 and determine a motion plan for controlling the motion of the vehicle 200 accordingly. The pose system 230 may be arranged to operate as described herein.

Various portions of the autonomous vehicle system 202 receive sensor data from the one or more sensors 201. For example, the sensors 201 may include remote detection sensors as well as other sensors, such as an inertial measurement unit (IMU), one or more encoders, one or more odometers, etc. The sensor data can include information that describes the location of objects within the surrounding environment of the vehicle 200, information that describes the motion of the vehicle, etc.

The sensors 201 may also include one or more remote detection sensors or sensor systems, such as a LIDAR, a RADAR, one or more cameras, etc. As one example, a LIDAR system of the one or more sensors 201 generates sensor data (e.g., remote sensor data) that includes the location (e.g., in three-dimensional space relative to the LIDAR system) of a number of points that correspond to objects that have reflected a ranging laser. For example, the LIDAR system can measure distances by measuring the Time of Flight (TOF) that it takes a short laser pulse to travel from the sensor to an object and back, calculating the distance from the known speed of light.

As another example, for a RADAR system of the one or more sensors 201 generate sensor data (e.g., remote sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, one or more cameras of the one or more sensors 201 may generate sensor data (e.g., remote sensor data) including still or moving images. Various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in image or images captured by the one or more cameras. Other sensor systems can identify the location of points that correspond to objects as well.

As another example, the one or more sensors 201 can include a positioning system. The positioning system can determine a current position of the vehicle 200. The positioning system can be any device or circuitry for analyzing the position of the vehicle 200. For example, the positioning system can determine a position by using one or more of inertial sensors, a satellite positioning system such as a Global Positioning System (GPS), based on IP address, by using triangulation and/or proximity to network access points or other network components (e.g., cellular towers, WiFi access points, etc.) and/or other suitable techniques. The position of the vehicle 200 can be used by various systems of the vehicle autonomy system 202.

Thus, the one or more sensors 201 can be used to collect sensor data that includes information that describes the location (e.g., in three-dimensional space relative to the vehicle 20) of points that correspond to objects within the surrounding environment of the vehicle 200. In some implementations, the sensors 201 can be located at various different locations on the vehicle 200. As an example, in some implementations, one or more cameras and/or LIDAR sensors can be located in a pod or other structure that is mounted on a roof of the vehicle 200 while one or more RADAR sensors can be located in or behind the front and/or rear bumper(s) or body panel(s) of the vehicle 200. As another example, camera(s) can be located at the front or rear bumper(s) of the vehicle 200 as well. Other locations can be used as well.

The pose system 230 receives some or all of the sensor data from sensors 201 and generates vehicle poses for the vehicle 200. A vehicle pose describes the position and attitude of the vehicle. The position of the vehicle 200 is a point in a three dimensional space. In some examples, the position is described by a values for a set of Cartesian coordinates, although any other suitable coordinate system may be used. The attitude of the vehicle 200 generally describes the way in which the vehicle 200 is oriented at its position. In some examples, attitude is described by a yaw about the vertical axis, a pitch about a first horizontal axis and a roll about a second horizontal axis. In some examples, the pose system 230 generates vehicle poses periodically (e.g., every second, every half second, etc.) The pose system 230 appends time stamps to vehicle poses, where the time stamp for a pose indicates the point in time that is described by the pose. The pose system 230 generates vehicle poses by comparing sensor data to reference data 226 describing the surrounding environment of the vehicle 200. The pose system 230, in some examples, is arranged similar to the pose system 130 of FIG. 1. For example, the pose system 130 may comprise one or more localizers and a pose state estimator, as described herein.

The perception system 203 detects objects in the surrounding environment of the vehicle 200 based on sensor data, reference data 226 and/or vehicle poses provided by the pose system 230. Reference data 226, for example, may provide detailed information about the surrounding environment of the vehicle 200, for example, relating remote sensor data to vehicle position and/or attitude. The reference data 226 can provide information regarding: the identity and location of different roadways, segments of roadways, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other reference data that provides information that assists the vehicle autonomy system 202 in comprehending and perceiving its surrounding environment and its relationship thereto. A roadway is a place where the vehicle can drive and may include, for example, a road, a street, a highway, a lane, a parking lot, a driveway, etc. The perception system 203 utilizes vehicle poses provided by the pose system 230 to place the vehicle 200 at a particular location and/or attitude, for example, based on reference data, and thereby predict which objects should be in the vehicle 200's surrounding environment.

In some examples, the perception system 203 determines state data for one or more of the objects in the surrounding environment of the vehicle 200. State data may describe a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the vehicle 200; minimum path to interaction with the vehicle 200; minimum time duration to interaction with the vehicle 200; and/or other state information.

In some implementations, the perception system 203 can determine state data for each object over a number of iterations. In particular, the perception system 203 can update the state data for each object at each iteration. Thus, the perception system 203 can detect and track objects, such as vehicles, that are proximate to the vehicle 200 over time.

The prediction system 204 is configured to predict one or more future positions for an object or objects in the environment surrounding the vehicle 200 (e.g., an object or objects detected by the perception system 203). The prediction system 204 can generate prediction data associated with one or more of the objects detected by the perception system 203. In some examples, the prediction system 204 generates prediction data describing each of the respective objects detected by the perspective system 204.

Prediction data for an object can be indicative of one or more predicted future locations of the object. For example, the prediction system 204 may predict where the object will be located within the next 5 seconds, 20 seconds, 200 seconds, etc. Prediction data for an object may indicate a predicted trajectory (e.g., predicted path) for the object within the surrounding environment of the vehicle 200. For example, the predicted trajectory (e.g., path) can indicate a path along which the respective object is predicted to travel over time (and/or the speed at which the object is predicted to travel along the predicted path). The prediction system 204 generates prediction data for an object, for example, based on state data generated by the perception system 203. In some examples, the prediction system 204 also considers one or more vehicle poses generated by the pose system 230 and/or reference data 226.

In some examples, the prediction system 204 uses state data indicative of an object type or classification to predict a trajectory for the object. As an example, the prediction system 204 can use state data provided by the perception system 203 to determine that particular object (e.g., an object classified as a vehicle) approaching an intersection and maneuvering into a left-turn lane intends to turn left. In such a situation, the prediction system 204 can predict a trajectory (e.g., path) corresponding to a left-turn for the vehicle such that the vehicle turns left at the intersection. Similarly, the prediction system 204 can determine predicted trajectories for other objects, such as bicycles, pedestrians, parked vehicles, etc. The prediction system 204 can provide the predicted trajectories associated with the object(s) to the motion planning system 205.

In some implementations, the prediction system 204 is a goal-oriented prediction system 204 that generates one or more potential goals, selects one or more of the most likely potential goals, and develops one or more trajectories by which the object can achieve the one or more selected goals. For example, the prediction system 204 can include a scenario generation system that generates and/or scores the one or more goals for an object and a scenario development system that determines the one or more trajectories by which the object can achieve the goals. In some implementations, the prediction system 204 can include a machine-learned goal-scoring model, a machine-learned trajectory development model, and/or other machine-learned models.

The motion planning system 205 determines a motion plan for the vehicle 200 based at least in part on the predicted trajectories associated with the objects within the surrounding environment of the vehicle, the state data for the objects provided by the perception system 203, vehicle poses provided by the pose system 230, and/or reference data 226. Stated differently, given information about the current locations of objects and/or predicted trajectories of objects within the surrounding environment of the vehicle 20, the motion planning system 205 can determine a motion plan for the vehicle 200 that best navigates the vehicle 200 relative to the objects at such locations and their predicted trajectories on acceptable roadways.

In some implementations, the motion planning system 205 can evaluate one or more cost functions and/or one or more reward functions for each of one or more candidate motion plans for the vehicle 200. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 205 can determine a total cost (e.g., a sum of the cost(s) and/or reward(s) provided by the cost function(s) and/or reward function(s)) of adhering to a particular candidate pathway. The motion planning system 205 can select or determine a motion plan for the vehicle 200 based at least in part on the cost function(s) and the reward function(s). For example, the motion plan that minimizes the total cost can be selected or otherwise determined. The motion plan can be, for example, a path along which the vehicle 200 will travel in one or more forthcoming time periods. In some implementations, the motion planning system 205 can be configured to iteratively update the motion plan for the vehicle 200 as new sensor data is obtained from one or more sensors 201. For example, as new sensor data is obtained from one or more sensors 201, the sensor data can be analyzed by the perception system 203, the prediction system 204, and the motion planning system 205 to determine the motion plan.

Each of the perception system 203, the prediction system 204, the motion planning system 205, and the pose system 230, can be included in or otherwise a part of a vehicle autonomy system configured to determine a motion plan based at least in part on data obtained from one or more sensors 201. For example, data obtained by one or more sensors 201 can be analyzed by each of the perception system 203, the prediction system 204, and the motion planning system 205 in a consecutive fashion in order to develop the motion plan. While FIG. 2 depicts elements suitable for use in a vehicle autonomy system according to example aspects of the present disclosure, one of ordinary skill in the art will recognize that other vehicle autonomy systems can be configured to determine a motion plan for an autonomous vehicle based on sensor data.

The motion planning system 205 can provide the motion plan to one or more vehicle control systems 207 to execute the motion plan. For example, the one or more vehicle control systems 207 can include throttle systems, brake systems, steering systems, and other control systems, each of which can include various vehicle controls (e.g., actuators or other devices that control gas flow, steering, braking, etc.) to control the motion of the vehicle. The various control systems 207 can include one or more controllers, control devices, motors, and/or processors.

The vehicle control systems 207 can include a brake control module 220. The brake control module 220 is configured to receive a braking command from the vehicle autonomy system 202 (e.g., from the motion planning system 205), and in response, brake the vehicle 200. In some examples, the brake control module 220 includes a primary system and a secondary system. The primary system may receive braking commands and, in response, brake the vehicle 200. The secondary system may be configured to determine a failure of the primary system to brake the vehicle 200 in response to receiving the braking command.

A steering control system 232 is configured to receive a steering command from the vehicle autonomy system 202 (e.g., from the motion planning system 205) and, in response provide a steering input to steer the vehicle 200. A throttle control system 234 is configured to receive a throttle command from the vehicle autonomy system (e.g., from the motion planning system 205) and, in response provide a throttle input to control the engine or other propulsion system of the vehicle 200. A lighting/auxiliary control module 236 may receive a lighting or auxiliary command. In response, the lighting/auxiliary control module 236 may control a lighting and/or auxiliary system of the vehicle 200. Controlling a lighting system may include, for example, turning on, turning off, or otherwise modulating headlines, parking lights, running lights, etc. Controlling an auxiliary system may include, for example, modulating windshield wipers, a defroster, etc.

The vehicle autonomy system 202 includes one or more computing devices, such as the computing device 211, that may implement all or parts of the perception system 203, the prediction system 204, the motion planning system 205 and/or the pose system 230. The example computing device 211 can include one or more processors 212 and one or more memory devices (collectively referred to as memory) 214. The one or more processors 212 can be any suitable processing device (e.g., a processor core, a microprocessor, an Application Specific Integrated Circuit (ASIC), a Field Programmable Gate Array (FPGA), a microcontroller, etc.) and can be one processor or a plurality of processors that are operatively connected. The memory 214 can include one or more non-transitory computer-readable storage mediums, such as Random Access Memory (RAM), Read Only Memory (ROM), Electrically Erasable Programmable Read Only Memory (EEPROM), Erasable Programmable Read Only Memory (EPROM), flash memory devices, magnetic disks, etc., and combinations thereof. The memory 214 can store data 216 and instructions 218 which can be executed by the processor 212 to cause the vehicle autonomy system 202 to perform operations. The one or more computing devices 211 can also include a communication interface 219, which can allow the one or more computing devices 211 to communicate with other components of the vehicle 200 or external computing systems, such as via one or more wired or wireless networks. Additional descriptions of hardware and software configurations for computing devices, such as the computing device(s) 211 are provided herein at FIGS. 8 and 9.

Figure 3:
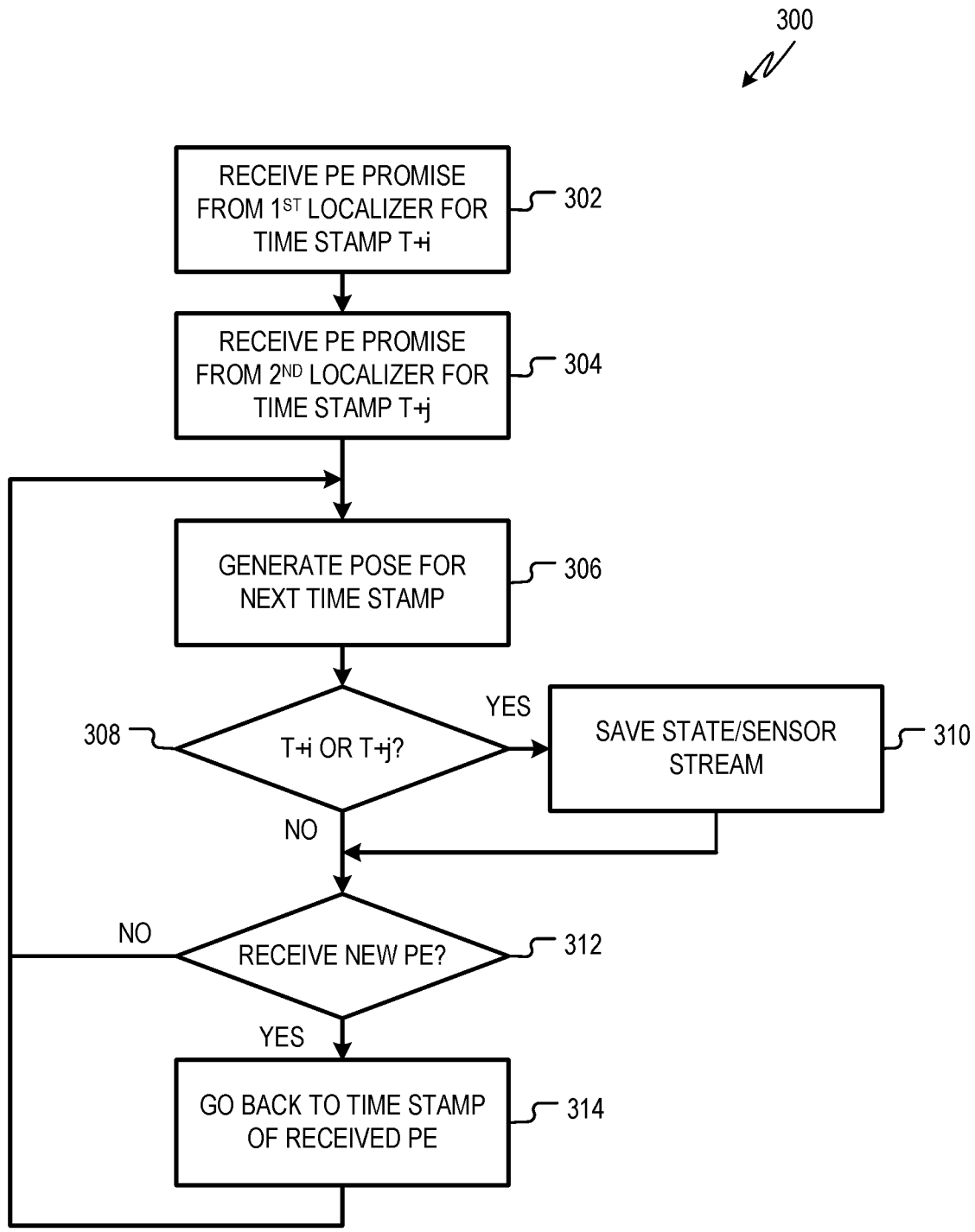
FIG. 3 is a flowchart showing one example of a process flow that may be executed by a pose state estimator of a pose system to generate vehicle poses from motion sensor data and from pose estimates generated by multiple pose localizers.

FIG. 3 is a flowchart showing one example of a process flow 300 that may be executed by a pose state estimator of a pose system to generate vehicle poses from motion sensor data and from pose estimates generated by multiple pose localizers. In the example process flow 300, the pose state estimator considers pose estimates from two different localizers, referred to as a first localizer and a second localizer. The first localizer and second localizer generate pose estimates by matching remote sensor data to different reference data, as described herein. For example, the first localizer may generate pose estimates by matching remote sensor data to first reference data indicating the expected spatial positions of objects indicated by the remote sensor data. The second localizer may generate pose estimates by matching remote sensor data to second reference data indicating expected reflectivity and/or return signal intensity by vehicle position and/or orientation.

At operation 302, the pose state estimator receives a pose estimate promise from the first localizer. The pose estimate promise includes data indicating that the first localizer will provide a pose estimate for a time stamp T+i, where T is a particular time stamp and "i" is a number of time stamps after the time stamp T. This indicates that the first localizers is determining or will determine a pose estimate describing the vehicle at the time stamp T+i and will provide the time stamp at some point in the future. In some examples, the pose estimate promise also includes data indicating when the pose estimate will be delivered to the pose state estimator. In some examples, the pose estimate promise indicates a period at which the first localizer provides pose estimates. For example, the first localizer may provide pose estimates at time stamps T+i, T+2i, T+3i, and so on. Also, in some examples, the first localizer provides separate pose estimate promises for different pose estimates. For example, when the first localizer determines that it will provide a subsequent pose estimate after the promised pose estimate at time stamp T+i, it may sent a subsequent pose estimate promise to the pose state estimator indicating the time stamp that will be described by the subsequent pose estimate.

At operation 304, the pose state estimator receives a pose estimate promise from the second localizer. The pose estimate promise from the second localizer includes data indicating that the second localizer will provide a pose estimate for a time stamp T+j, where "j" is a number of time stamps after the time stamp T. Like the pose estimate received from the first localizer at operation 302, the pose estimate promise from the second localizer may indicate a single pose estimate to be provided at time stamp T+j, or a period at which the second localizer will provide pose estimates. In various implementations, the first and second localizers may provide pose estimates at the same time stamp or at different time stamps. For example, "i" may be equal to "j" or different than "j."

At operation 306, the pose state estimator generates a vehicle pose for a next time stamp. For example, if the vehicle pose for time stamp T is the last time stamp for which the pose state estimator has generated a pose estimate, the pose state estimator generates a vehicle pose for the vehicle at time stamp T+1. The vehicle pose generated at operation 306 may be based on the previous vehicle pose (e.g., for time stamp T) and on motion sensor data, such as data from the IMU, one or more encoders, one or more odometers, one or more Global Positioning System (GPS) sensors, etc. The pose state estimator generates the vehicle pose, in some examples, by executing a Kalman filter. The Kalman filter takes as input the vehicle pose for the previous time stamp (e.g., time stamp T), along with one or more covariance indicators. For example, the vehicle pose for the previous time stamp may be described by a covariance indicator. Also, in some examples, the pose state estimator considers previous pose estimates from the first and/or second localizers, including covariance indicators for those pose estimates. The Kalman filter may also take as input motion sensor data that has been captured since the previous time stamp. As output, the Kalman filter provides a next vehicle pose and a covariance indicator for the next vehicle pose. The vehicle pose generated at operation 306 is provided to the vehicle autonomy system for use as described herein.

At operation 308, the pose state estimator determines if the current time stamp (e.g., the time stamp described by the vehicle pose generated at operation 306) is a time stamp that will later be described by a pose estimate from one or more of the localizers. In this example, that may mean determining whether the current time stamp is either T+i (which will be described by the pose estimate from first localizer) or T+j (which will be described by the pose estimate from the second localizer). In examples where one or both of the localizers provide periodic pose estimates, determining if the current time stamp will later be described by a pose estimate includes determining if a scheduled period of one or more of the localizers includes providing a pose estimate at the current time stamp.

If the current time stamp is a time stamp that will later be described by a pose estimate from one or more of the localizers, the pose state estimator saves its current state and/or sensor stream at operation 310. In this way, the pose state estimator may recall its state and sensor stream to later generate an updated vehicle pose for the current time stamp after the expected pose estimate or estimates are received. The saved state may include the vehicle pose for the current time stamp, which may include a covariance indicator for the vehicle pose and/or covariance indicators for one or more pose estimates for previous time stamps that were considered to generate the pose estimate. In some examples, the saved state data also includes one or more previous vehicle poses (e.g., describing time stamps prior to the current time stamp). The saved sensor stream may include, for example, motion sensor data received since the time stamp of the last-determined vehicle pose.

If the current time stamp will not be later described by a pose estimate, or upon saving the state and/or sensor stream of for the current time stamp, the pose state estimator, at operation 312, determines if it has received a new pose estimate (e.g., a pose estimate from the first localizer or the second localizer). If not, then pose state estimator proceeds back to operation 306 and generates a vehicle pose for the next time stamp.

If a new pose estimate has been received, the pose state estimator, at operation 314, resets the current time stamp to the pose estimate time stamp, where the pose estimate time stamp is the time stamp described by the pose estimate. In the example of FIG. 3, if the pose estimate is from the first localizer, and the pose estimate time stamp is T+i, then the pose state estimator sets the current time stamp to T+i. Then the pose state estimator returns to operation 306 and generates a new vehicle pose for the pose estimate time stamp. Setting the current time stamp to the pose estimate time stamp may involve moving the pose state estimator "backwards" in time. For example, the pose state estimator may have already generated an initial vehicle pose for the pose estimate time stamp, for example, based on the previous vehicle pose or poses and motion sensor data. Accordingly, at operation 306, the pose state estimator generates an updated vehicle pose. The updated vehicle pose is provided to the vehicle autonomy system for use as described herein.

Figure 4:
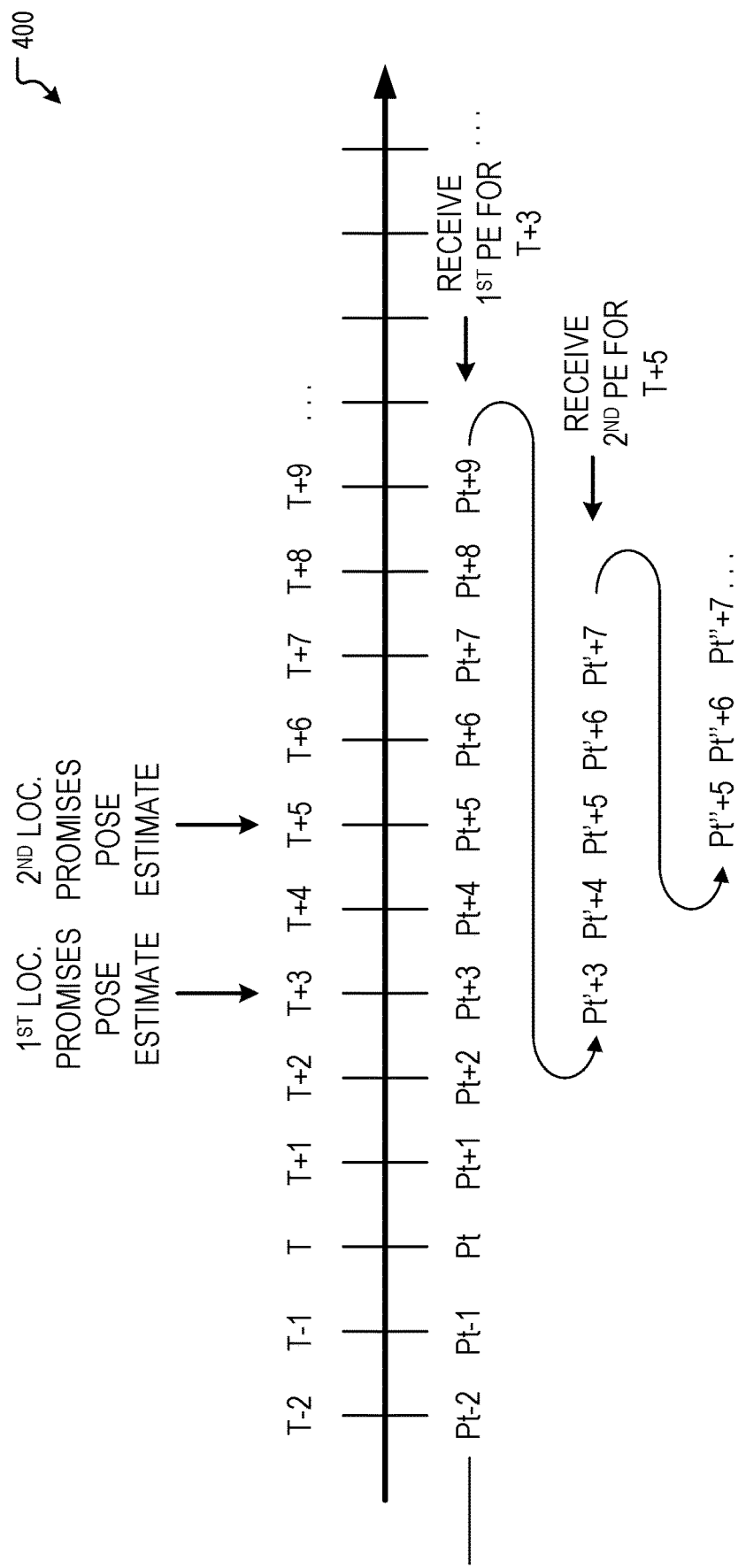
FIG. 4 is a timeline showing one example illustration of a pose state estimator generating vehicle poses from motion sensor data and from pose estimates generated by localizers.

FIG. 4 is a timeline 400 showing one example illustration of a pose state estimator generating vehicle poses from motion sensor data and from pose estimates generated by localizers. The timeline 400 shows one example implementation of the process flow 300 of FIG. 3. On the timeline 400, each vertical line indicates a time stamp, with time stamps indicating later times from left-to-right. Time stamps are labeled on the top of the timeline 400. Vehicle poses generated by the pose state estimator are indicated below the timeline 400. In this example, the first localizer has promised a first pose estimate describing the time stamp T+3 and the second localizer has promised a second pose estimate describing the time stamp T+5.

The pose state estimator is configured to generate vehicle poses for the various time stamps (T, T+1, T+2, and so on). For time stamp T, the pose state estimator generates a vehicle pose, labeled Pt. The pose state estimator generates the vehicle pose Pt, for example, based on previous vehicle poses (Pt-1, Pt-2, and so on) and motion sensor data (e.g., motion sensor data describing time since the previous vehicle post). In some examples, this includes executing a Kalman filter or other model that considers covariance indicators for the previous vehicle poses and/or for previous pose estimates that affected the previous vehicle poses.

The pose state estimator continues to generate vehicle poses Pt+1, Pt+2, and so on based on the previous vehicle poses and on motion sensor data. When the pose state estimator generates vehicle poses for the time stamps T+3 and T+5 for which pose estimates are promised, the pose state estimator may store its state and sensor stream, for example, as described at operation 310 of the process flow 300.

In the example of FIG. 4, the pose state estimator receives, from the first localizer, the first pose estimate describing time stamp T+3 after it has generated the vehicle pose Pt+9 for the time stamp T+9. The pose state estimator then returns to the time stamp T+3 and generates a revised vehicle pose Pt'+3 for the time stamp T+3 considering the first pose estimate. In some examples, the pose state estimator recalls the stored state and sensor stream data describing the time stamp T+3. The revised pose Pt'+3 is based on the recalled state and sensor stream for the time stamp T+3 and the first pose estimate. The pose state estimator continues to generate revised vehicle poses Pt'+4, Pt'+5, Pt'+6 and so on.

In the example of FIG. 4, the pose state estimator receives, from the second localizer, the second pose estimate describing the time stamp T+5 after it has generated the vehicle pose Pt'+7 for the time stamp T+7. The pose state estimator then returns to the time stamp T+5 and generates a revised vehicle post Pt"+5 for the time stamp T+5 considering the second pose estimate. The pose state estimator may recall the stored state and sensor stream data describing the time stamp T+5. The revised vehicle pose Pt"+5 may be based on one or more previous vehicle poses, such as Pt'+4, as well as the stored state and sensor stream for the time stamp T+5. The pose state estimator continues to generate revised vehicle poses Pt"+6, Pt"+7, and so on.

Figure 5:
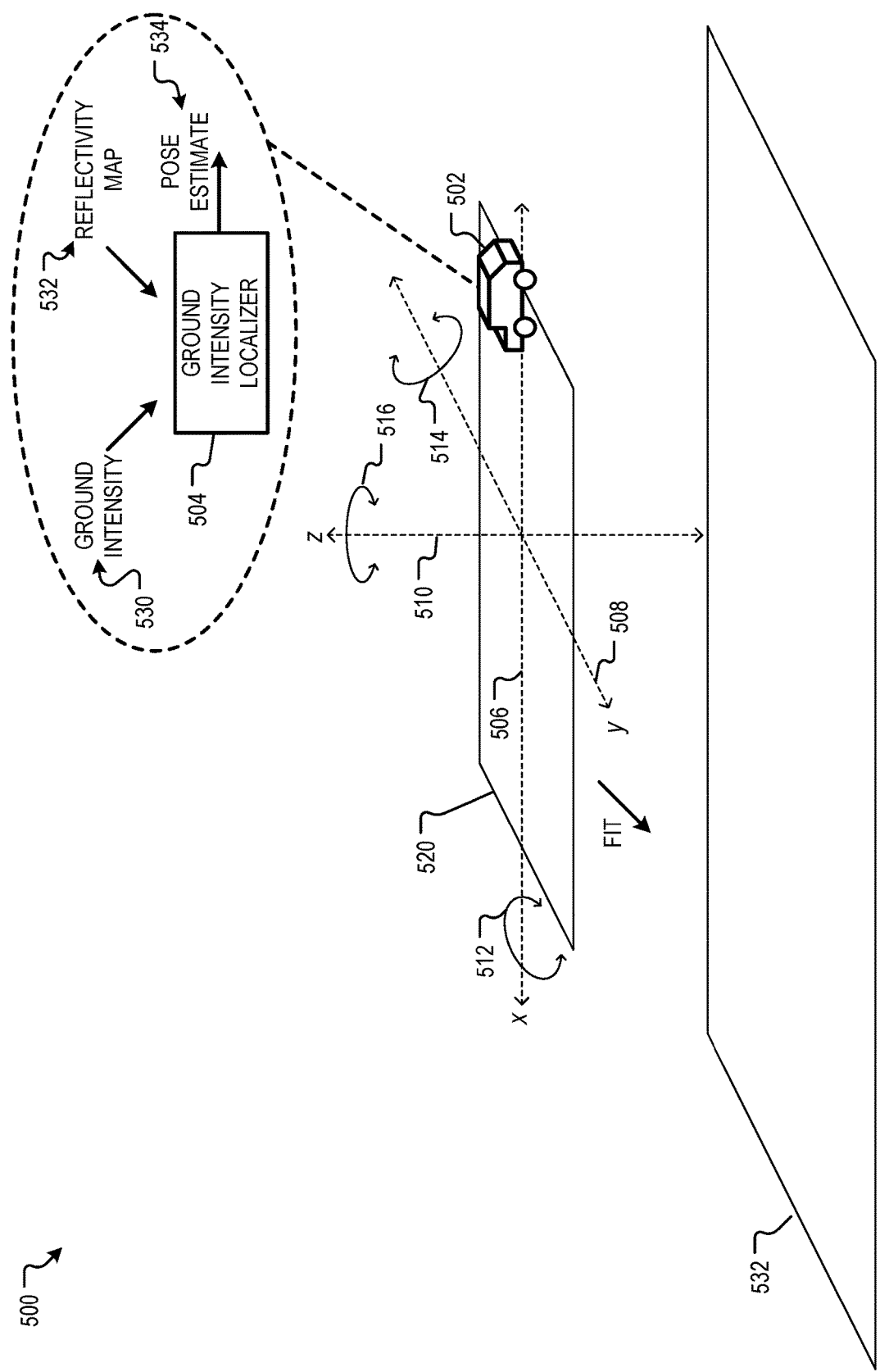
FIG. 5 is a diagram showing one example environment that illustrates the operation of a localizer that generates a pose estimate by matching remote sensor data indicating ground reflectivity to reference data that relates ground reflectivity and height to vehicle pose.

FIG. 5 is a diagram showing one example environment 500 that illustrates the operation of a localizer 504 that generates a pose estimate 534 by matching remote sensor data indicating ground reflectivity to reference data that relates ground reflectivity and height to vehicle pose. The pose estimate 534 generated by the localizer 504 may be provided to a pose state estimator that operates, for example, as described herein.

In FIG. 5, a vehicle 502 is shown positioned on a surface 520. Although the surface 520 is flat for illustration purposes, in practice, a vehicle may be positioned on a surface with grade, hills, buildings, or other features. The pose estimate 534 for the vehicle 502 includes an estimated position of the vehicle 502 and an estimated attitude of the vehicle 502. Any suitable coordinate system may be used to express the position and attitude of the vehicle 502. In the example of FIG. 5, a Cartesian coordinate system is shown. For example, the spatial position of the vehicle 502 may be described by positions on a first horizontal axis or x-axis 506, a second horizontal axis or y-axis 508, and a vertical axis or z-axis 510. The attitude of the vehicle 502 may be described by a pitch 514 about the y-axis, a roll 512 about the x-axis, and a yaw 516 about the z-axis.

The localizer 504 generates the pose estimate 534 by matching ground point reflectivity data 530 to reference data, which in the example of FIG. 5 includes a ground reflectivity map 532. Ground point reflectivity data 530 indicates ground reflectivity and height for a plurality of points on or near the surface 520 on which the vehicle 502 is operating. The ground point reflectivity data 530, in some examples, is derived from LIDAR, RADAR or other remote sensor data. The ground reflectivity for a point on the surface 520 may be the intensity of the return signal from light, radio waves, etc. For example, points on the surface 520 with higher reflectivity may reflect more of the light and/or radio waves emitted by the LIDAR and/or RADAR sensor, resulting in higher intensity returns. The height of a point on the surface 520 indicates a position on the z-axis 510. Heights for points described by the ground point reflectivity 530 may be determined, for example, from the time of flight of light, radio waves, etc. from the LIDAR, RADAR or other remote detection sensor to the physical point on the surface 520 and back.

The localizer 504 matches the ground point reflectivity data 530 to the ground reflectivity map 532 by finding the best fit between the reflectivity and sensed height of the ground point data 530 and the reflectivity and height indications of the ground reflectivity map 532.

Figure 6:
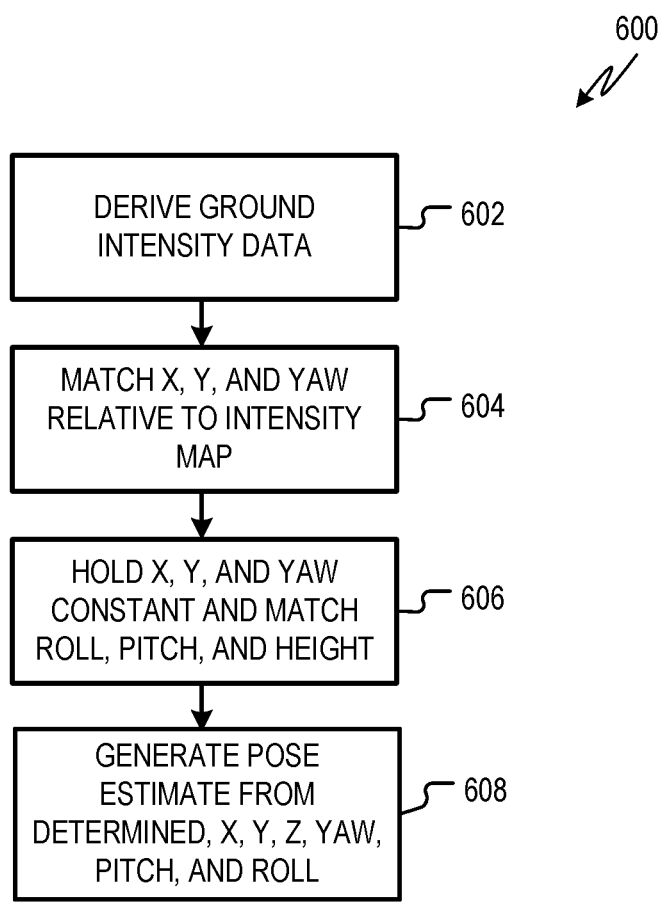
FIG. 6 is a flowchart showing one example of a process flow that may be executed by a localizer to generate a pose estimate by matching remote sensor data indicating ground reflectivity and height to reference data that relates ground reflectivity and height to vehicle pose.

FIG. 6 is a flowchart showing one example of a process flow 600 that may be executed by a localizer to generate a pose estimate by matching remote sensor data indicating ground reflectivity and height to reference data that relates ground reflectivity and height to vehicle pose. For example, the process flow 600 shows one example way that the localizer 504 of FIG. 5 can generate the pose estimate 534.

At operation 602, the localizer derives ground intensity data. The ground intensity data may be derived from an output of a LIDAR, RADAR, or other remote detection sensor. In some examples, the localizer receives remote sensor data from a LIDAR, RADAR, or other remote detection sensor that indicates an intensity and time-of-flight for a plurality of points. Some of those points, referred to herein as ground points, indicate reflections off of the ground. Others points indicate reflections off of other objects in the vehicle's environment, such as, for example, buildings, landmarks, other vehicles, etc.

Deriving the ground intensity data includes separating the points from the remote sensor data that indicate reflections off of the ground. This may be performed in any suitable way. In some examples, the localizer, or other suitable component, uses a regression or other suitable method to fit small planes to the points of the remote sensor data. Points that are fit to planes having a normal that is vertical, or within a threshold of vertical, may be considered ground points. Points that are fit to planes having normals that are not vertical are considered to be parts of other objects (e.g., not ground). In some examples, planes having normals that are parallel to one another that are considered ground points. For example, a plane may be considered parallel to another plane if the two planes' normals differ by less than a threshold angle.

At operation 604, the localizer matches the x-axis, y-axis, and yaw values of the ground intensity data to the ground reflectivity reference data, which in the example of FIG. 6 includes a ground reflectivity map. For example, localizer projects the ground intensity data onto the ground reflectivity map at different combinations of x-axis, y-axis, and yaw values. Each considered combination of x-axis, y-axis, and yaw values is referred to as an x/y/yaw projection. The localizer may consider any suitable number of x/y/yaw projections. In some examples, the localizer considers every possible x/y/yaw projection.

The localizer finds the best-fit x/y/yaw projection by identifying the x/y/yaw projection with the lowest overall error. For example, a given x/y/yaw projection correlates some or all of the points of the ground point reflectivity data with points on the ground reflectivity map. Each correlated point is described by an error, where the error is the difference between the ground reflectivity and height indicated by the ground intensity data at the correlated point and the reflectivity and height indicated by the ground reflectivity map. The localizer may find the best-fit x/y/yaw projection by identifying the projection with the lowest aggregate error.

At operation 606, the localizer holds the x-axis, y-axis, and yaw values constant, for example, at the best-fit values determined at operation 604. With the x-axis, y-axis, and yaw values held constant, the localizer finds the best-fit values for roll, pitch, and height, where height is a z-axis value. For example, the localizer may generate a set of projections of the ground point reflectivity data onto the ground reflectivity map for different values of roll, pitch, and height, referred to as roll/pitch/height projections. Each of the roll/pitch/height projections is made with the x-axis, y-axis, and yaw values held constant. Any suitable number of roll/pitch/height projections can be considered. The localizer selects the roll/pitch/height projection that minimizes the error between the ground intensity data and the ground reflectivity map to find a best-fit roll/pitch/height projection.

At operation 608, the localizer returns a pose estimate. The returned pose estimate includes the x, y, and yaw values determined at operation 604 as well as the roll, pitch, and height values determined at operation 606. The pose estimate may also include a covariance indicator that describes the accuracy of the pose estimate. The localizer may determine the covariance indicator based on the errors of the best-fit x/y/yaw projection and the best-fit roll/pitch/height projection.

Figure 7:
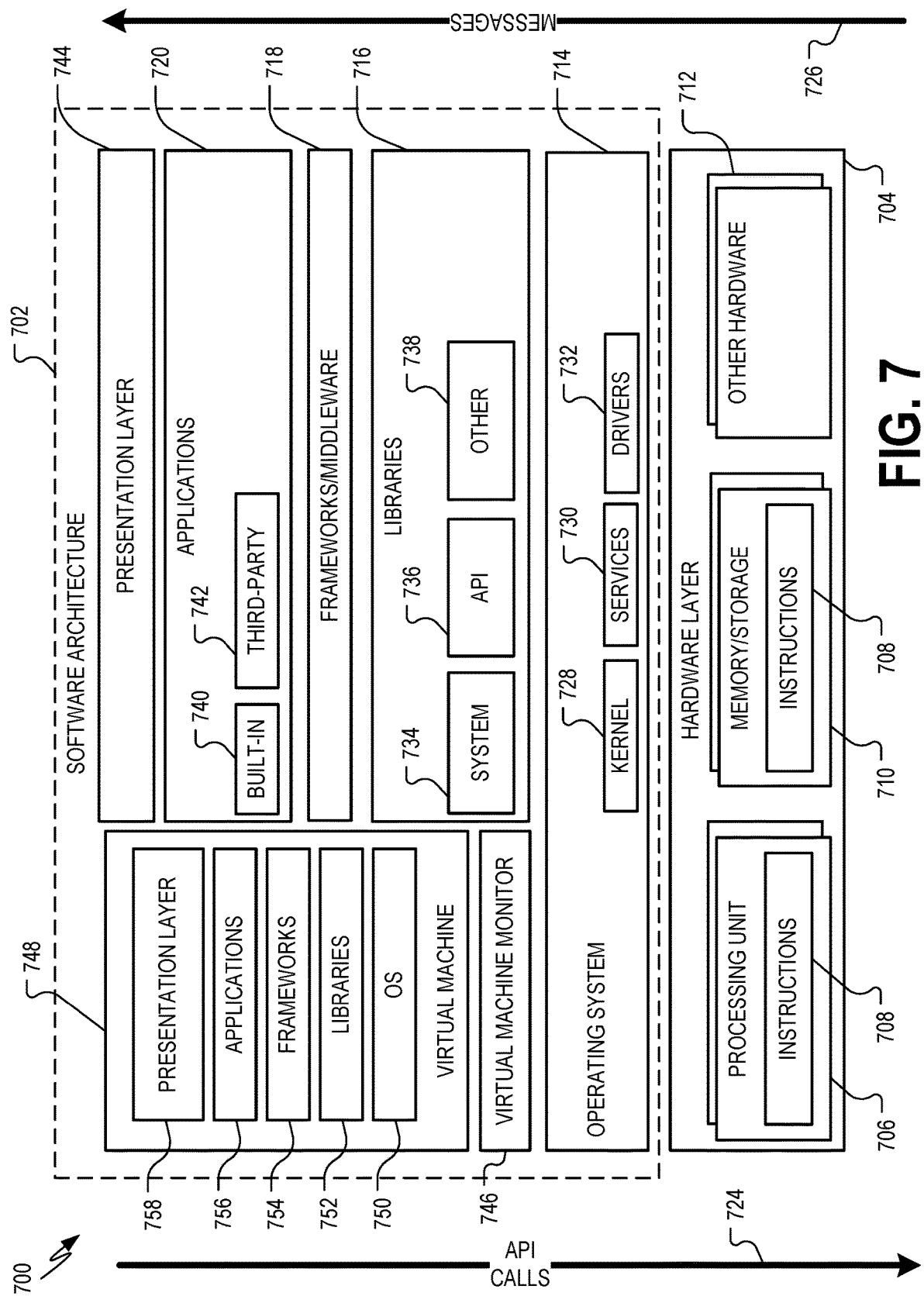
FIG. 7 is a block diagram showing one example of a software architecture for a computing device.

FIG. 7 is a block diagram 700 showing one example of a software architecture 702 for a computing device. The software architecture 702 may be used in conjunction with various hardware architectures, for example, as described herein. FIG. 7 is merely a non-limiting example of a software architecture 702 and many other architectures may be implemented to facilitate the functionality described herein. A representative hardware layer 704 is illustrated and can represent, for example, any of the above-referenced computing devices. In some examples, the hardware layer 704 may be implemented according to an architecture 800 of FIG. 8 and/or the architecture 702 of FIG. 7.

The representative hardware layer 704 comprises one or more processing units 706 having associated executable instructions 708. The executable instructions 708 represent the executable instructions of the software architecture 702, including implementation of the methods, modules, components, and so forth of FIGS. 1-6. The hardware layer 704 also includes memory and/or storage modules 710, which also have the executable instructions 708. The hardware layer 704 may also comprise other hardware 712, which represents any other hardware of the hardware layer 704, such as the other hardware illustrated as part of the architecture 800.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720, and a presentation layer 744. Operationally, the applications 720 and/or other components within the layers may invoke API calls 724 through the software stack and receive a response, returned values, and so forth illustrated as messages 726 in response to the API calls 724. The layers illustrated are representative in nature and not all software architectures have all layers. For example, some mobile or special-purpose operating systems may not provide a frameworks/middleware 718 layer, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of a hardware or software interrupt and, in response, cause the software architecture 702 to pause its current processing and execute an ISR when an interrupt is received. The ISR may generate an alert.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than by interfacing directly with the underlying operating system 714 functionality (e.g., kernel 728, services 730, and/or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be utilized by the applications 720 and/or other software components/modules. For example, the frameworks 718 may provide various graphical user interface (GUI) functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. The third-party applications 742 may include any of the built-in applications 740 as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 742 may invoke the API calls 724 provided by the mobile operating system such as the operating system 714 to facilitate functionality described herein.

The applications 720 may utilize built-in operating system functions (e.g., kernel 728, services 730, and/or drivers 732), libraries (e.g., system libraries 734, API libraries 736, and other libraries 738), or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 7, this is illustrated by a virtual machine 748. A virtual machine creates a software environment where applications/modules can execute as if they were executing on a hardware computing device. The virtual machine 748 is hosted by a host operating system (e.g., the operating system 714) and typically, although not always, has a virtual machine monitor 746, which manages the operation of the virtual machine 748 as well as the interface with the host operating system (e.g., the operating system 714). A software architecture executes within the virtual machine 748, such as an operating system 750, libraries 752, frameworks/middleware 754, applications 756, and/or a presentation layer 758. These layers of software architecture executing within the virtual machine 748 can be the same as corresponding layers previously described or may be different.

Figure 8:
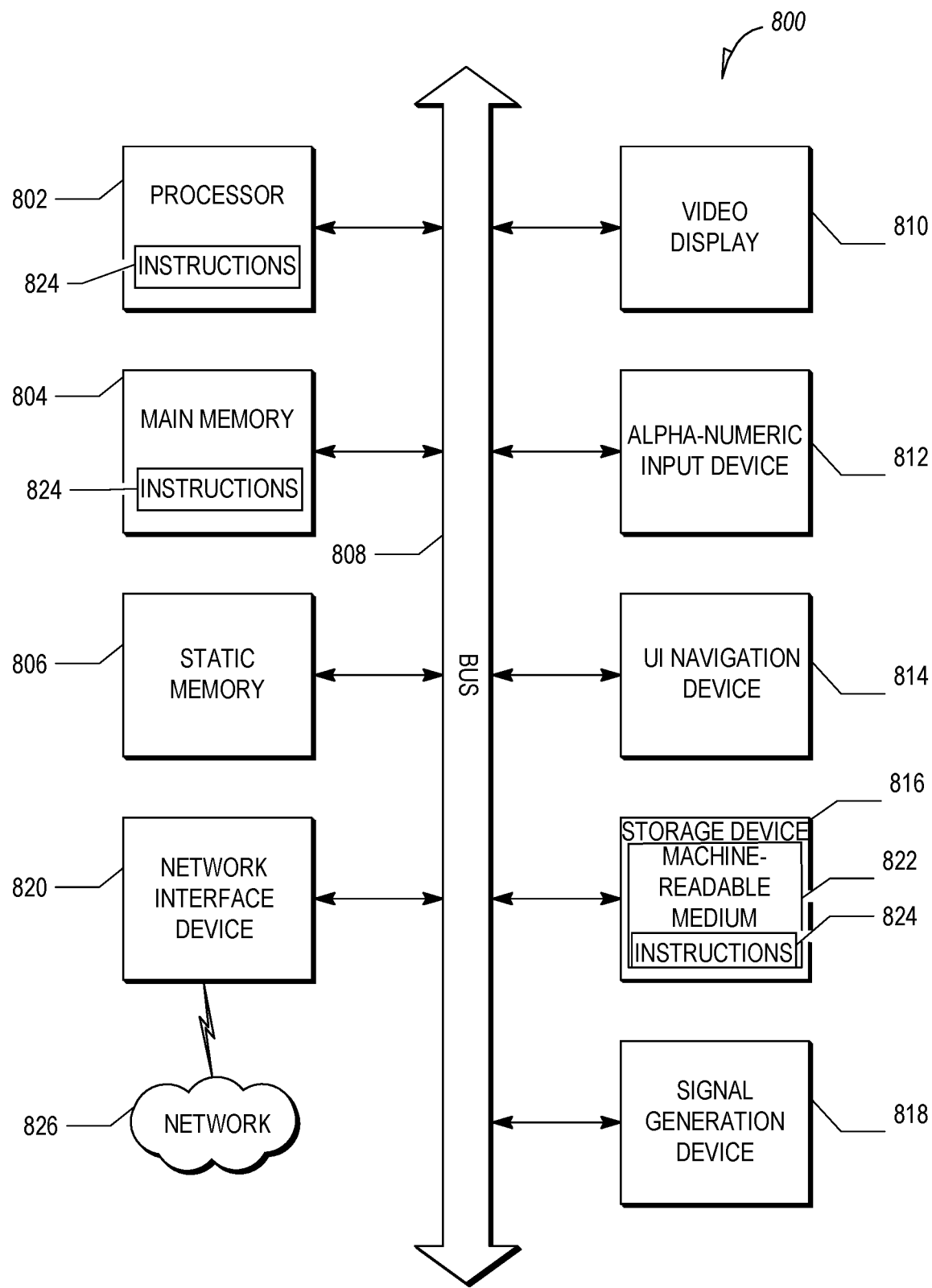
FIG. 8 is a block diagram illustrating a computing device hardware architecture, within which a set or sequence of instructions can be executed to cause a machine to perform examples of any one of the methodologies discussed herein.

FIG. 8 is a block diagram illustrating a computing device hardware architecture 800, within which a set or sequence of instructions can be executed to cause a machine to perform examples of any one of the methodologies discussed herein.

The architecture 800 may describe, a computing device for executing the control system, localizer(s), and/or pose state estimator described herein.

The architecture 800 may operate as a standalone device or may be connected (e.g., networked) to other machines. In a networked deployment, the architecture 800 may operate in the capacity of either a server or a client machine in server-client network environments, or it may act as a peer machine in peer-to-peer (or distributed) network environments. The architecture 800 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 800 includes a processor unit 802 comprising at least one processor (e.g., a central processing unit (CPU), a graphics processing unit (GPU), or both, processor cores, compute nodes, etc.). The architecture 800 may further comprise a main memory 804 and a static memory 806, which communicate with each other via a link 808 (e.g., bus). The architecture 800 can further include a video display unit 810, an input device 812 (e.g., a keyboard), and a UI navigation device 814 (e.g., a mouse). In some examples, the video display unit 810, input device 812, and UI navigation device 814 are incorporated into a touchscreen display. The architecture 800 may additionally include a storage device 816 (e.g., a drive unit), a signal generation device 818 (e.g., a speaker), a network interface device 820, and one or more sensors (not shown), such as a Global Positioning System (GPS) sensor, compass, accelerometer, or other sensor.

In some examples, the processor unit 802 or another suitable hardware component may support a hardware interrupt. In response to a hardware interrupt, the processor unit 802 may pause its processing and execute an ISR, for example, as described herein.

The storage device 816 includes a machine-readable medium 822 on which is stored one or more sets of data structures and instructions 824 (e.g., software) embodying or utilized by any one or more of the methodologies or functions described herein. The instructions 824 can also reside, completely or at least partially, within the main memory 804, within the static memory 806, and/or within the processor unit 802 during execution thereof by the architecture 800, with the main memory 804, the static memory 806, and the processor unit 802 also constituting machine-readable media.

Executable Instructions and Machine-Storage Medium

The various memories (i.e., 804, 806, and/or memory of the processor unit(s) 802) and/or storage device 816 may store one or more sets of instructions and data structures (e.g., instructions) 824 embodying or utilized by any one or more of the methodologies or functions described herein. These instructions, when executed by processor unit(s) 802 cause various operations to implement the disclosed examples.

As used herein, the terms "machine-storage medium," "device-storage medium," "computer-storage medium" (referred to collectively as "machine-storage medium 822") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 822 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 822 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 824 can further be transmitted or received over a communications network 826 using a transmission medium via the network interface device 820 utilizing any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A system for determining a pose of a vehicle, comprising:
    at least one processor unit;
    a machine-readable medium comprising instructions thereon that, when executed by the at least one processor unit, cause the at least one processor unit to perform operations comprising:
        generating, by a first localizer executed by the at least one processor unit, a first pose estimate for the vehicle based at least in part on a comparison of first remote sensor data to first reference data;
        generating, by a second localizer executed by the at least one processor unit, a second pose estimate for the vehicle based at least in part on a comparison of second remote sensor data to second reference data; and
        generating, by a pose state estimator executed by the at least one processor unit, a vehicle pose for the vehicle based at least in part on a first previous pose of the vehicle, the first pose estimate, and the second pose estimate.

2. The system of claim 1, wherein the first remote sensor data describes ground reflectivity data, and wherein the first reference data describes ground reflectivity data associated with a map.

3. The system of claim 2, wherein the first remote sensor data comprises ground reflectivity data, and wherein the machine-readable medium further comprises instructions thereon that, when executed by the at least one processor unit, causes the at least one processor unit to perform operations comprising:
    selecting, based at least in part on the ground reflectivity data, a first horizontal axis position on a first horizontal axis, a second horizontal axis position on a second horizontal axis perpendicular to the first horizontal axis, and a yaw about a vertical axis perpendicular to the first horizontal axis and the second horizontal axis; and
    selecting a vertical axis position, a pitch about the first horizontal axis, and a roll about the second horizontal axis, wherein the selecting is based at least in part on the first horizontal axis position, the second horizontal axis position, the yaw, and the ground reflectivity data.

4. The system of claim 1, wherein the first remote sensor data describes sensed height and sensed reflectivity for a plurality of ground points.

5. The system of claim 1, wherein the second remote sensor data describes a position of a first object, and wherein the second reference data describes the position of the first object.

6. The system of claim 1, wherein the first pose estimate corresponds to a first time stamp and the second pose estimate corresponds to a second time stamp after the first time stamp, wherein the first previous pose is for the first time stamp, and wherein the first previous pose is based at least in part on the first pose estimate.

7. The system of claim 6, wherein the machine-readable medium further comprises instructions thereon that, when executed by the at least one processor unit, causes the at least one processor unit to perform operations comprising generating, by the pose state estimator, an initial pose for the second time stamp based at least in part on the first pose estimate and first sensor data describing the vehicle.

8. The system of claim 1, wherein the machine-readable medium further comprises instructions thereon that, when executed by the at least one processor unit, causes the at least one processor unit to perform operations comprising determining, by the pose state estimator, that a first covariance indicator for the first pose estimate indicates a lower confidence in the first pose estimate than a second covariance indicator indicates for the second pose estimate, wherein the vehicle pose is closer to the first pose estimate than to the second pose estimate.

9. The system of claim 1, wherein the machine-readable medium further comprises instructions thereon that, when executed by the at least one processor unit, causes the at least one processor unit to perform operations comprising:
    determining, by the pose state estimator, that a first covariance indicator for the first pose estimate indicates a higher confidence level in a first dimension than a second covariance indicator for the second pose estimate; and
    determining, by the pose state estimator, that the second covariance indicator indicates a higher confidence level in a second dimension than the first covariance indicator, wherein the vehicle pose is closer to the first pose estimate than to the second pose estimate in the first dimension, and wherein the vehicle pose is closer to the second pose estimate than to the first pose estimate in the second dimension.

10. A computer-implemented method for determining a pose of a vehicle, comprising:
    generating, by at least one processor unit, a first pose estimate for the vehicle based at least in part on a comparison of first remote sensor data to first reference data;
    generating, by the at least one processor unit, a second pose estimate for the vehicle based at least in part on a comparison of second remote sensor data to second reference data; and
    generating, by the at least one processor unit, a vehicle pose for the vehicle based at least in part on a first previous pose of the vehicle, the first pose estimate, and the second pose estimate.

11. The method of claim 10, wherein the first remote sensor data includes ground reflectivity data, and wherein the first reference data includes ground reflectivity data associated with a map.

12. The method of claim 11, wherein the first remote sensor data comprises ground reflectivity data, further comprising:
   selecting, based at least in part on the ground reflectivity data, a first horizontal axis position on a first horizontal axis, a second horizontal axis position on a second horizontal axis perpendicular to the first horizontal axis, and a yaw about a vertical axis perpendicular to the first horizontal axis and the second horizontal axis; and
   selecting a vertical axis position, a pitch about the first horizontal axis, and a roll about the second horizontal axis, wherein the selecting is based at least in part on the first horizontal axis position, the second horizontal axis position, the yaw, and the ground reflectivity data.

13. The method of claim 10, wherein the first remote sensor data describes sensed height and sensed reflectivity for a plurality of ground points.

14. The method of claim 10, wherein the second remote sensor data describes a position of a first object, and wherein the second reference data describes the position of the first object.

15. The method of claim 10, wherein the first pose estimate corresponds to a first time stamp and the second pose estimate corresponds to a second time stamp after the first time stamp, wherein the first previous pose is for the first time stamp, and wherein the first previous pose is based at least in part on the first pose estimate.

16. The method of claim 15, further comprising generating, by the at least one processor unit, an initial pose for the second time stamp based at least in part on the first pose estimate and first sensor data describing the vehicle.

17. The method of claim 10, further comprising determining, by the at least one processor unit, that a first covariance indicator for the first pose estimate indicates that level than a second covariance indicator for the second pose estimate, wherein the vehicle pose is closer to the first pose estimate than to the second pose estimate.

18. The method of claim 10, further comprising:
   determining, by the at least one processor unit, that a first covariance indicator for the first pose estimate indicates a higher confidence level in a first dimension than a second covariance indicator for the second pose estimate; and
   determining, by the at least one processor unit, that the second covariance indicator indicates a higher confidence level in a second dimension than the first covariance indicator, wherein the vehicle pose is closer to the first pose estimate than to the second pose estimate in the first dimension, and wherein the vehicle pose is closer to the second pose estimate than to the first pose estimate in the second dimension.

19. A tangible machine-readable medium comprising instructions thereon that, when executed by at least one processor unit, causes the at least one processor unit to perform operations comprising:
   generating, by a first localizer executed by the at least one processor unit, a first pose estimate for a vehicle based at least in part on a comparison of first remote sensor data to first reference data;
   generating, by a second localizer executed by the at least one processor unit, a second pose estimate for the vehicle based at least in part on a comparison of second remote sensor data to second reference data; and
   generating, by a pose state estimator executed by the at least one processor unit, a vehicle pose for the vehicle based at least in part on a first previous pose of the vehicle, the first pose estimate, and the second pose estimate.

20. The machine-readable medium of claim 19, wherein the machine-readable medium further comprises instructions thereon that, when executed by the at least one processor unit, causes the at least one processor unit to perform operations comprising determining, by the pose state estimator, that a first covariance indicator for the first pose estimate indicates a lower confidence in the first pose estimate than a second covariance indicator indicates for the second pose estimate, wherein the vehicle pose is closer to the first pose estimate than to the second pose estimate.

* * * * *